US012769961B2

(12) United States Patent
Koh

(10) Patent No.: US 12,769,961 B2
(45) Date of Patent: Oct. 20, 2026

(54) APPARATUS AND METHOD FOR RECEIVING TIRE PRESSURE MONITORING SIGNAL

(71) Applicants: HYUNDAI MOTOR COMPANY, Seoul (KR); KIA CORPORATION, Seoul (KR)

(72) Inventor: Sang Bum Koh, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 109 days.

(21) Appl. No.: 18/616,895

(22) Filed: Mar. 26, 2024

(65) Prior Publication Data

US 2025/0190726 A1 Jun. 12, 2025

(30) Foreign Application Priority Data

Dec. 8, 2023 (KR) ........................ 10-2023-0177210

(51) Int. Cl.
*G06K 7/10* (2006.01)
*B60C 23/04* (2006.01)
(Continued)

(52) U.S. Cl.
CPC ........ *G06K 7/10366* (2013.01); *B60C 23/041* (2013.01); *B60C 23/0438* (2013.01); *B60T 8/171* (2013.01); *B60T 13/74* (2013.01); *F16D 65/18* (2013.01); *G06K 19/07764* (2013.01); *H04W 4/80* (2018.02); *B60C 2200/04* (2013.01); *B60T 2240/03* (2013.01); *B60Y 2410/111* (2013.01); *F16D 65/005* (2013.01); *F16D 2121/18* (2013.01)

(58) Field of Classification Search
CPC .......... G06K 7/10366; G06K 19/07764; B60C 23/041; B60C 23/0438; B60C 2200/04; B60T 8/171; B60T 13/74; B60T 2240/03; F16D 65/18; F16D 65/005; F16D 2121/18; H04W 4/80; B60Y 2410/111
See application file for complete search history.

(56) References Cited

U.S. PATENT DOCUMENTS 6,879,252 B2 * 4/2005 DeZorzi .............. B60C 23/0416 340/447
2008/0143507 A1 * 6/2008 Cotton ................ B60C 23/0472 340/447

(Continued)

FOREIGN PATENT DOCUMENTS

CN 202480794 U 10/2012
CN 115674961 A 2/2023

*Primary Examiner* — Lindsay M Low
*Assistant Examiner* — Susan E Scharpf
(74) *Attorney, Agent, or Firm* — Morgan, Lewis & Bockius LLP

(57) ABSTRACT

An apparatus for receiving a tire pressure monitoring signal includes a radio frequency identification (RFID) tag configured to transmit tire condition information; a radio frequency identification (RFID) reader configured to receive the tire condition information; and a first controller configured to communicate with the radio frequency identification (RFID) reader and to control power supplied to the radio frequency identification (RFID) reader, wherein the first controller is configured to control an electro-mechanical brake (EMB).

20 Claims, 6 Drawing Sheets

(51) Int. Cl.

| | |
|---|---|
| ***B60T 8/171*** | (2006.01) |
| ***B60T 13/74*** | (2006.01) |
| ***F16D 65/00*** | (2006.01) |
| ***F16D 65/18*** | (2006.01) |
| ***F16D 121/18*** | (2012.01) |
| ***G06K 19/077*** | (2006.01) |
| ***H04W 4/80*** | (2018.01) |

(56) References Cited

U.S. PATENT DOCUMENTS

| | | | | |
|---|---|---|---|---|
| 2014/0002258 | A1* | 1/2014 | Chen | B60C 23/0461<br>340/447 |
| 2016/0144674 | A1* | 5/2016 | Darrer | B60C 19/00<br>340/447 |
| 2017/0291591 | A1* | 10/2017 | Steer | B60T 8/885 |
| 2018/0231076 | A1* | 8/2018 | Choi | F16D 65/0006 |
| 2021/0021015 | A1* | 1/2021 | Fenkanyn | B60C 23/0444 |
| 2025/0190726 | A1* | 6/2025 | Koh | B60C 23/041 |

* cited by examiner

APPARATUS AND METHOD FOR RECEIVING TIRE PRESSURE MONITORING SIGNAL

CROSS-REFERENCE TO RELATED APPLICATIONS

The present application claims priority to Korean Patent Application No. 10-2023-0177210 filed on Dec. 8, 2023, the entire contents of which is incorporated herein for all purposes by this reference.

BACKGROUND OF THE PRESENT DISCLOSURE

Field of the Present Disclosure

The present disclosure relates to an apparatus and a method for receiving a tire pressure monitoring signal.

Description of Related Art

Tires may greatly affect traveling of a vehicle. When tire pressure is high, ride comfort may deteriorate and tires may be severely worn. When tire pressure is low, tires may be under-inflated, and sidewalls of tires may be damaged and steering may be degraded. Accordingly, vehicle manufacturers indicate appropriate tire pressures for respective vehicles.

A tire pressure monitoring system (TPMS) may be configured for measuring pressure in a tire and informing a user of the pressure. The TPMS may measure pressure in a tire and may notify a user when the pressure is insufficient or excessive so that system may maintain tire pressure at an appropriate level and may prepare for accidents caused by tire punctures.

A general tire pressure monitoring system may have an issue in which, due to a distance between a sensor provided on a wheel side and a receiver provided on a vehicle body, the sensor may consume more power in a process of wirelessly transmitting detected pressure information than in sensing pressure.

Accordingly, to reduce battery usage in a sensor, a general tire pressure monitoring system may transmit a signal only when a vehicle is travelling above a predetermined speed or time between transmissions may be lengthened.

Also, in a general tire pressure monitoring system, a procedure for entering an ID of a sensor of each wheel into a receiver is necessary.

Accordingly, when a TPMS sensor position changes, such as tire replacement, position exchange, and sensor replacement, an operator may need to dispose a wireless inspection device close to each of the four wheels and to enter information manually, or may need to automatically check and correct whether a sensor ID of each wheel is the same as an ID registered in a receiver through discrimination/input logic while a vehicle is travelling.

Furthermore, in the case of using a method of automatically relearning the ID every time a vehicle is travelling, to prevent mislearning of the sensor ID (ID) of other vehicles travelling nearby and to learn an accurate sensor ID, the vehicle may need to travel for a predetermined time period after starting.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an apparatus and a method for receiving a tire pressure monitoring signal battery, which may reduce power consumption of a sensor of a tire pressure monitoring system and may immediately recognize identification (ID) information of the sensor.

According to an exemplary embodiment of the present disclosure, an apparatus for receiving a tire pressure monitoring signal includes a radio frequency identification (RFID) tag configured to transmit tire condition information; a radio frequency identification (RFID) reader configured to receive the tire condition information; and a first controller configured to communicate with the radio frequency identification (RFID) reader and to control power supplied to the radio frequency identification (RFID) reader, wherein the first controller is configured to control an electro-mechanical brake (EMB).

The radio frequency identification (RFID) tag may be provided in a sensor configured to detect the tire condition information.

The sensor may further include a storage portion configured to store the tire condition information.

The apparatus may further include a styling cover provided on an external side of the electronic braking apparatus, wherein the radio frequency identification (RFID) reader receives the tire condition information transmitted by the radio frequency identification (RFID) tag using the styling cover.

The radio frequency identification (RFID) reader may be provided on the first controller.

The radio frequency identification (RFID) reader may be provided on the styling cover.

A distance between the radio frequency identification (RFID) tag and the radio frequency identification (RFID) reader may change when a vehicle travels.

The radio frequency identification (RFID) reader may be configured to determine whether to receive the tire condition information transmitted by the radio frequency identification (RFID) tag based on results of comparing predetermined first and second distances with a distance between the radio frequency identification (RFID) tag and the radio frequency identification (RFID) reader.

The radio frequency identification (RFID) reader may receive the tire condition information transmitted by the radio frequency identification (RFID) tag when a distance between the radio frequency identification (RFID) tag and the radio frequency identification (RFID) reader decreases and is smaller than the first distance.

The radio frequency identification (RFID) reader may not receive the tire condition information transmitted by the radio frequency identification (RFID) tag when a distance between the radio frequency identification (RFID) tag and the radio frequency identification (RFID) reader increases and is greater than the second distance.

A pair of radio frequency identification (RFID) tags and the radio frequency identification (RFID) reader may be provided for each tire included in the vehicle, and the radio frequency identification (RFID) reader may receive only the tire condition information transmitted from the adjacent radio frequency identification (RFID) tag.

A distance between the radio frequency identification (RFID) tag and the radio frequency identification (RFID)

reader may be measured using signal strength between the radio frequency identification (RFID) tag and the radio frequency identification (RFID) reader.

According to an exemplary embodiment of the present disclosure, a method for receiving a tire pressure monitoring signal includes measuring a distance between a radio frequency identification (RFID) tag and a radio frequency identification (RFID) reader; processing tire condition information when a distance between a radio frequency identification (RFID) tag and a radio frequency identification (RFID) reader decreases and is smaller than a predetermined first distance; and processing tire condition information when a distance between a radio frequency identification (RFID) tag and a radio frequency identification (RFID) reader increases and is greater than a predetermined second distance.

The radio frequency identification (RFID) reader may communicate with the radio frequency identification (RFID) reader and a first controller configured to control an electromechanical brake (EMB), and may receive power.

The radio frequency identification (RFID) reader may be provided on a styling cover provided on an external side of the electronic braking apparatus.

The radio frequency identification (RFID) tag may rotate with a tire and may be provided in a sensor configured to detect the tire condition.

A pair of the radio frequency identification (RFID) tag and the radio frequency identification (RFID) reader may be provided for each tire provided in a vehicle, the receiving the tire condition information may include receiving only the tire condition information transmitted from the adjacent radio frequency identification (RFID) tag by the radio frequency identification (RFID) reader.

The measuring a distance between the radio frequency identification (RFID) tag and the radio frequency identification (RFID) reader may include measuring using signal strength between the radio frequency identification (RFID) tag and the radio frequency identification (RFID) reader.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
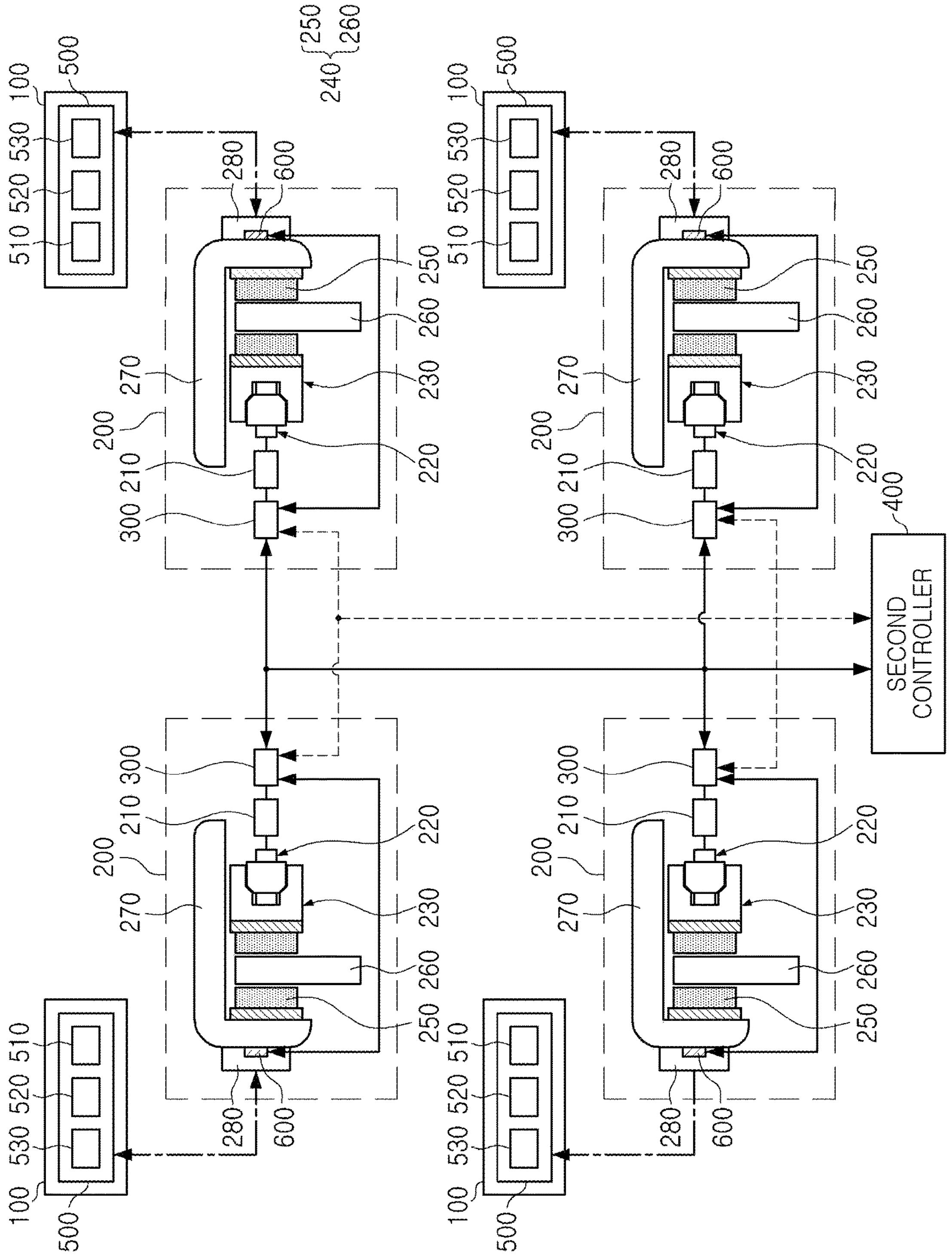
FIG. 1 is a diagram illustrating an apparatus for receiving a tire pressure monitoring signal according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described with reference to the appended drawings.

Various embodiments will be described with reference to accompanying drawings. However, this may not necessarily limit the scope in the exemplary embodiments to a specific embodiment form. Instead, modifications, equivalents and replacements included in the included concept and technical scope of the present description may be employed.

In the exemplary embodiments of the present disclosure, the terms "first," "second," and the like may be used to distinguish one element from the other, and may not limit a sequence and/or an importance, or others, in relation to the elements. In some cases, a first element may be referred to as a second element, and similarly, a second element may be referred to as a first element without departing from the scope of right in the exemplary embodiments of the present disclosure.

The exemplary embodiment of the present disclosure may be implemented in various manners, and are not limited to the exemplary embodiments described herein. An expression used in the singular encompasses the expression of the plural, unless it has a clearly different meaning in the context. The terms, "include," "comprise," "is configured to," or the like, of the description are used to indicate the presence of features, numbers, steps, operations, elements, parts or combination thereof, and do not exclude the possibilities of combination or addition of one or more features, numbers, steps, operations, elements, parts or combination thereof.

Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

In embodiment, "... part," "... unit," and the like, may be implemented in various manners, for example, a processor, program instructions executed by a processor, a software module, a microcode, a computer program product, a logic circuit, an application-specific integrated circuit, firmware, or the like, or may be implemented by hardware.

FIG. 1 is a diagram illustrating an apparatus for receiving a tire pressure monitoring signal according to an exemplary embodiment of the present disclosure.

An apparatus for receiving a tire pressure monitoring signal according to various exemplary embodiments of the present disclosure may receive a tire pressure monitoring signal including tire condition information using radio frequency identification (RFID) not having a power source.

Here, radio frequency identification (RFID) may refer to a technique of transferring information through radio frequency.

Referring to FIG. 1, an apparatus for receiving a tire pressure monitoring signal according to various exemplary embodiments of the present disclosure may include a radio frequency identification (RFID) tag 500, a radio frequency identification (RFID) reader 600, and a first controller 300.

The radio frequency identification (RFID) tag 500 may be provided on a wheel and may transmit tire condition information received from the sensor 100 for detecting a tire condition.

The radio frequency identification (RFID) tag 500 may include an antenna configured to receive a wireless signal transmitted from a reader and a microchip configured to convert the received signal into power and to process and transmit data.

The radio frequency identification (RFID) tag 500 may be provided to the sensor 100, and the radio frequency identification (RFID) tag 500 and the sensor 100 may be connected to each other by wire.

The radio frequency identification (RFID) tag 500 may be a passive RFID tag and may operate using energy propagated from an external entity without directly generating power.

For example, the radio frequency identification (RFID) tag 500 may not include a power source and may operate using energy propagated from a radio frequency identification (RFID) reader 600, which will be described later.

The radio frequency identification (RFID) tag 500 may further include a storage portion 530.

The storage portion 530 may temporarily store tire condition information received from the sensor 100.

The storage portion 530 may be an electrically erasable programmable read-only memory or an electrically erasable programmable read-only memory (EEPROM).

The radio frequency identification (RFID) reader 600 may transmit radio frequency to the radio frequency identification (RFID) tag 500 so that power may be generated in the radio frequency identification (RFID) tag 500, and the radio frequency identification (RFID) reader 600 may receive tire state information transmitted from a radio frequency identification (RFID) tag 500.

Here, the passive radio frequency identification (RFID) process will be described.

First, the passive radio frequency identification (RFID) may generate a radio frequency identification (RFID) reader 600 transmission signal. The radio frequency identification (RFID) reader 600 may be configured to generate a wireless signal and transmit the signal to a surrounding area.

Here, the wireless signal may be generally generated through an antenna of the radio frequency identification (RFID) reader 600, and the wireless signal may reach a nearby radio frequency identification (RFID) tag.

The transmitted wireless signal may be received by a passive radio frequency identification (RFID) tag 500.

The passive radio frequency identification (RFID) tag 500 may include an antenna 510 configured to receive wireless signals generated in the surroundings. The passive radio frequency identification (RFID) tag 500 may operate using energy propagated from an external entity rather than generating power autonomously.

When the antenna 510 of the passive radio frequency identification (RFID) tag 500 receives a wireless signal, power may be supplied to a microchip 520 in the passive radio frequency identification (RFID) tag 500 using energy of the wireless signal.

The microchip 520 of the passive radio frequency identification (RFID) tag 500 may operate using energy and may be configured for processing stored information.

The microchip 520 of the passive radio frequency identification (RFID) tag 500 may read or write stored information using the received energy.

Here, the stored information may include a unique identification number of the tag and tire condition information received from the sensor 100.

The passive radio frequency identification (RFID) tag 500 may wirelessly transmit information including a unique identification number and tire condition information.

The radio frequency identification (RFID) reader 600 may receive a signal transmitted from the passive radio frequency identification (RFID) tag 500 and may interpret the information.

The passive radio frequency identification (RFID) tag 500 and the radio frequency identification (RFID) reader 600 may transmit and receive signals by modulating and demodulating signals.

Here, as for a modulation method, amplitude modulation or phase modulation may be applied.

Here, the radio frequency identification (RFID) reader 600 may transmit and receive a wireless signal using a single antenna.

For example, the radio frequency identification (RFID) reader 600 may utilize time division (TDM-time division multiplexing), which allocates transmission and reception to specific time slots. By use of time division, the radio frequency identification (RFID) reader 600 may prevent collisions between signals and may ensure stable transmission and reception of information.

The first controller 300 may be an apparatus for controlling the electro-mechanical brake (EMB) 200, which generates braking force on wheels of a vehicle.

Here, the electro-mechanical brake (EMB) 200 may include a driving unit 210, a power transfer unit 220, a power conversion unit 230, a braking force generation unit 240, and a first controller 300.

The driving unit 210 may provide a braking force which may generate a braking force in the braking force generation unit 240. The driving unit 210 may be an actuator configured to receive electricity and to generate braking force. The driving unit 210 may be configured to generate braking force by rotation generated by the actuator. For example, the actuator can be an electric motor (e.g., DC motor, stepper motor, brushless DC motor, servo motor, linear actuator, etc.).

The power transfer unit 220 may receive braking force caused by rotation of the driving unit 210. The power transfer unit 220 may include spins and may be connected to the driving unit 210 and may receive rotational energy of the driving unit 210.

The power conversion unit 230 may convert braking force of the rotation received by the power transfer unit 220 into linear movement.

For example, the power conversion unit 230 may be a ball screw. When the braking force of the rotation received from the power transfer unit 220 rotates the screw, the ball may move linearly along the screw.

Alternatively, the power conversion unit 230 may include a bolt rotating integrally with spins, a nut moving forwards and backwards in accordance with rotation of the bolt, and a nut on an internal side, and may include a piston moving together with the nut.

One end portion of the power conversion unit 230 may be connected to the power transfer unit 220 transferring braking force of rotational movement, and the other end portion may be connected to the braking force generation unit 240.

The braking force generation unit 240 may be connected to the power conversion unit 230, may move linearly, and may be configured to generate braking force by pressing the brake disc 260.

For example, the braking force generation unit 240 may include at least one brake pad 250. Also, the braking force generation unit 240 may be two brake pads 250 disposed to oppose each other with a brake disc 260 therebetween.

The braking force generation unit 240 may be configured to generate braking force using friction generated when two brake pads 250 opposing each other press the brake disc 260 in both directions.

In other words, the driving unit 210 may be configured to generate rotation energy based on the first controller 300, and the power transfer unit 220 may receive the rotation energy of the driving unit 210 and may transfer the energy to the power conversion unit 230.

The power conversion unit 230 may convert the rotation energy of the driving unit 210 received from the power transfer unit 220 into linear movement energy. The braking force generation unit 240 may move by converted linear kinetic energy and may pressurize the brake disc 260, generating braking force.

The first controller 300 may adjust a size of braking force in the electro-mechanical brake (EMB) 200 by controlling the driving unit 210.

The second controller 400 may be connected to the first controller 300 and may provide control information corresponding to braking force from the electro-mechanical brake (EMB) 200 or braking force to be generated from the electro-mechanical brake (EMB) 200 to the first controller 300.

The second controller 400 may implement electronic Stability Control (ESC), Anti-lock Braking System (ABS), Traction Control System (TCS), Electric Power Steering (EPS), Adaptive Cruise Adaptive Cruise Control (ADB), Lane Departure Warning (LDW), and Lane Keeping Assist (LKA), related to vehicle movement control, by individually controlling the first controller 300 provided at each wheel.

Figure 2:
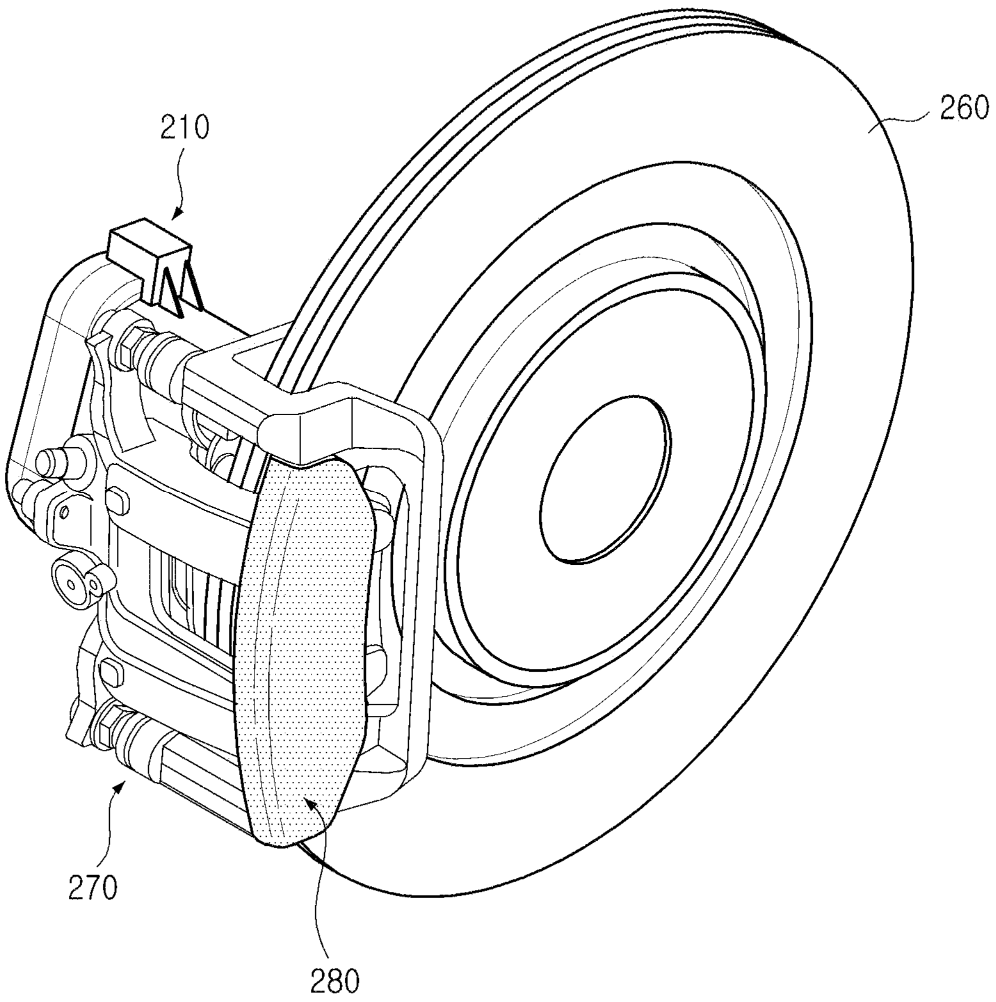
FIG. 2 is a perspective diagram illustrating an electronic braking apparatus including a styling cover according to an exemplary embodiment of the present disclosure.
Figure 3:
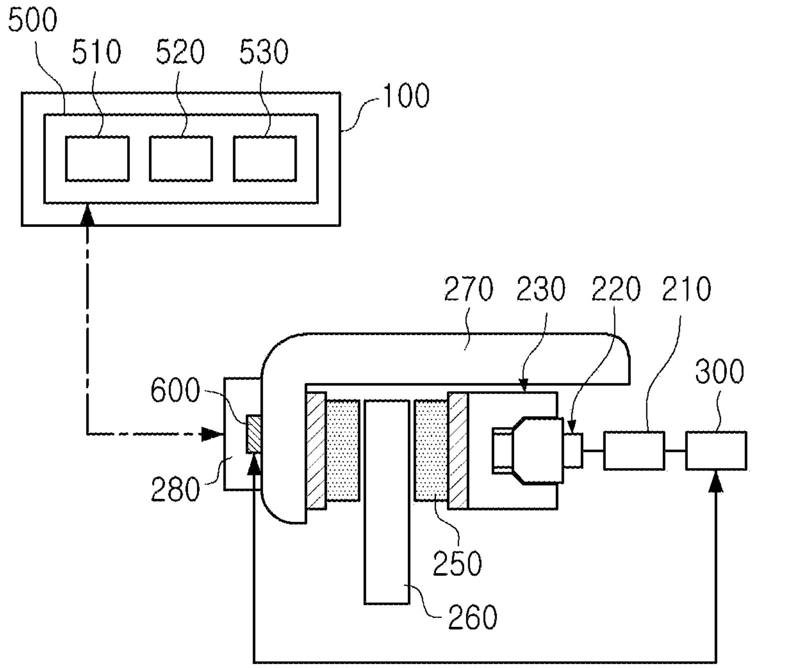
FIG. 3 is a diagram illustrating an apparatus for receiving a tire pressure monitoring signal including a styling cover according to an exemplary embodiment of the present disclosure.
Figure 4:
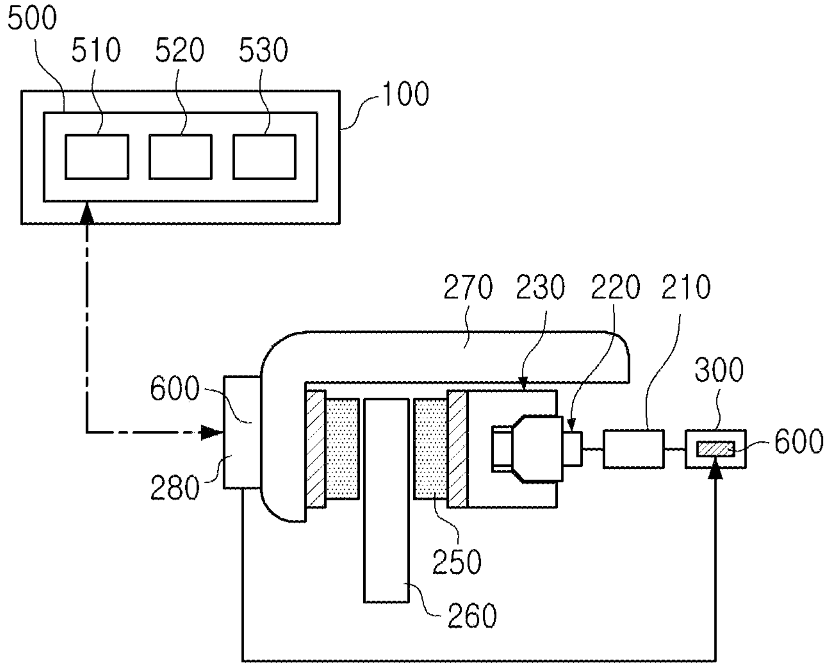
FIG. 4 is a diagram illustrating an apparatus for receiving a tire pressure monitoring signal including a styling cover according to an exemplary embodiment of the present disclosure.

FIG. 2 is a perspective diagram illustrating an electronic braking apparatus including a styling cover according to an exemplary embodiment of the present disclosure. FIG. 3 is a diagram illustrating an apparatus for receiving a tire pressure monitoring signal including a styling cover according to an exemplary embodiment of the present disclosure. FIG. 4 is a diagram illustrating an apparatus for receiving a tire pressure monitoring signal including a styling cover according to an exemplary embodiment of the present disclosure.

Referring to FIG. 2, an electro-mechanical brake (EMB) 200 may further include a styling cover 280.

The styling cover 280 may decorate an exterior of the braking apparatus and may add styling, and may be a plate-shaped component attached to improve the exterior of the caliper housing 270 visible between wheel spokes.

Here, the caliper housing 270 may protect the brake disc 260 and the brake pad 250 and may be an external casing surrounding the braking force generation unit.

The apparatus for receiving a tire pressure monitoring signal according to various exemplary embodiments of the present disclosure may use the styling cover 280 as an antenna for RFID.

The styling cover 280 may be provided close to the sensor 100 for detecting the tire condition, and may be disposed close to the passive radio frequency identification (RFID) tag 500 provided in the sensor 100, improving efficiency and accuracy of the radio frequency identification (RFID).

Furthermore, when the radio frequency identification (RFID) reader 600 is provided in the styling cover 280, the styling cover 280 may protect the radio frequency identification (RFID) reader 600 from external shock.

Referring to FIG. 3, in the apparatus for receiving a tire pressure monitoring signal according to an exemplary embodiment of the present disclosure, a radio frequency identification (RFID) reader 600 may be provided in the styling cover 280.

The styling cover 280 may be connected to a radio frequency identification (RFID) reader 600 and may be used as an antenna.

Here, the radio frequency identification (RFID) reader 600 may be provided integrally with the styling cover 280.

The first controller 300 may be connected to the radio frequency identification (RFID) reader 600 by wire, may supply power to and communicate with the reader.

For example, the first controller 300 and the radio frequency identification (RFID) reader 600 may be connected by twisted pair, coaxial cable, fiber optic cable, and power line communication (PLC).

Referring to FIG. 4, in the apparatus for receiving a tire pressure monitoring signal according to another exemplary embodiment of the present disclosure, a radio frequency identification (RFID) reader 600 may be provided in a first controller 300 of an electro-mechanical brake 200 (EMB).

The styling cover 280 may be connected to the radio frequency identification (RFID) reader 600 or the first controller 300 and may be used as an antenna.

The styling cover 280 and the radio frequency identification (RFID) reader 600 or the first controller 300 may be connected using an antenna cable.

For example, the styling cover 280 and the radio frequency identification (RFID) reader 600 or the first controller 300 may be connected using an RG-58 cable, low loss coaxial cable (LMR), and an optical fiber antenna cable.

Figure 5A:
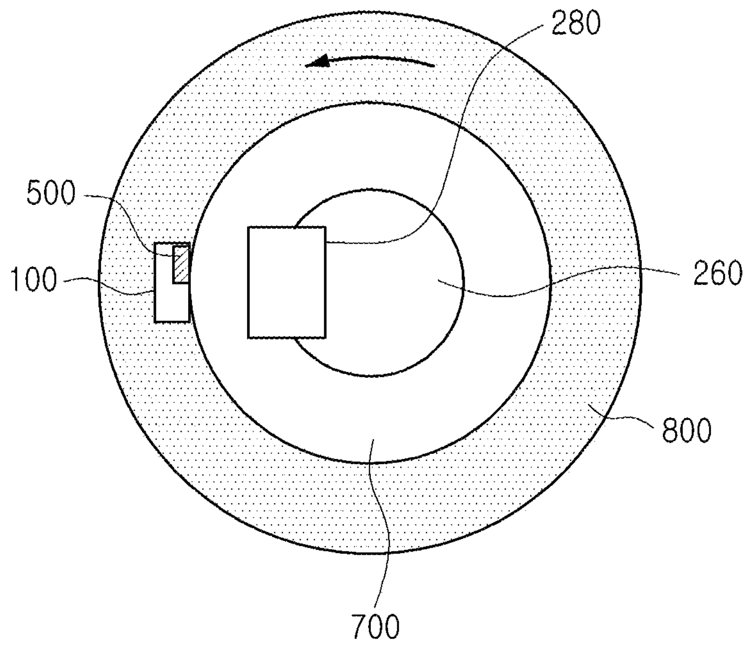
FIG. 5A, FIG. 5B, and FIG. 5C are diagrams illustrating a state of an apparatus for receiving a tire pressure monitoring signal depending on traveling of a vehicle according to an exemplary embodiment of the present disclosure.
Figure 5B:
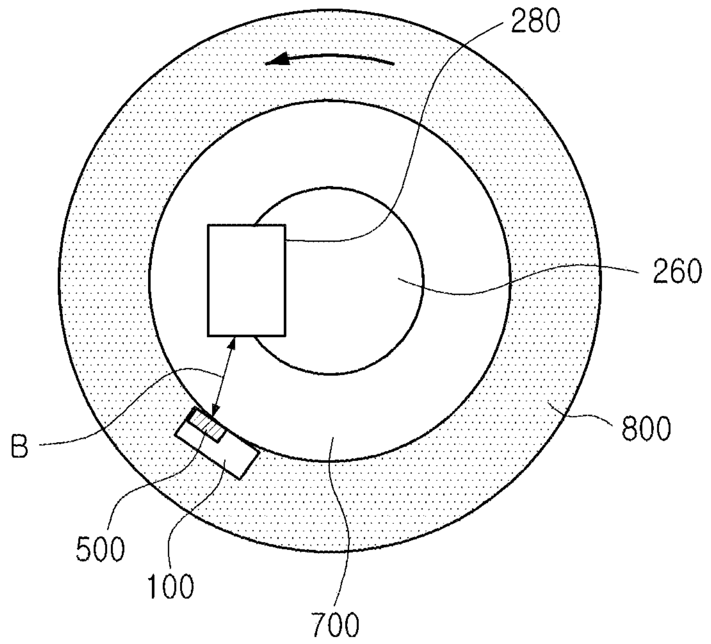
Figure 5C:
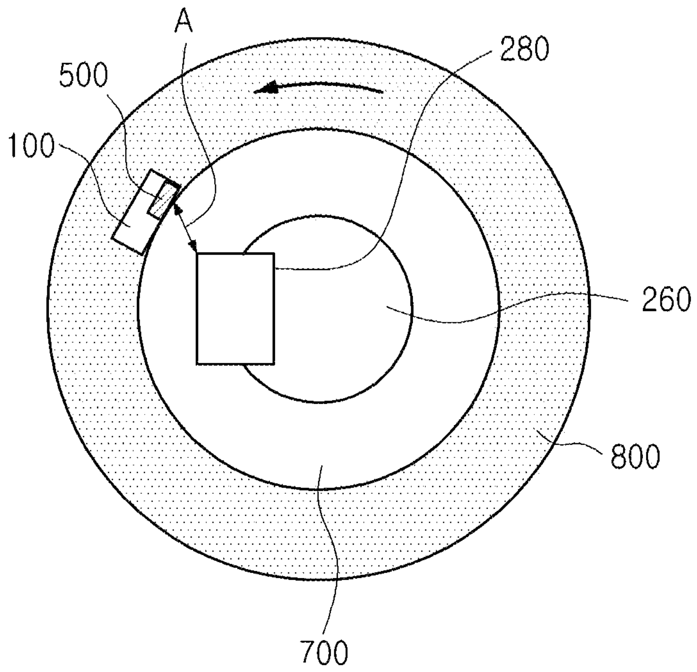

FIG. 5A, FIG. 5B, and FIG. 5C are diagrams illustrating a state of an apparatus for receiving a tire pressure monitoring signal depending on traveling of a vehicle according to an exemplary embodiment of the present disclosure.

Referring to FIG. 5A, FIG. 5B, and FIG. 5C, a passive radio frequency identification (RFID) tag 500 provided in a sensor 100 may rotate with a wheel 700 and a tire 800 as the vehicle travels, and the radio frequency identification (RFID) reader 600 provided in the electronic braking device 200 (EMB) may maintain a constant position despite the vehicle traveling.

Accordingly, a relative distance between the passive radio frequency identification (RFID) tag 500 and the radio frequency identification (RFID) reader 600 may change as the vehicle travels.

The apparatus for receiving a tire pressure monitoring signal according to various exemplary embodiments of the present disclosure may use a styling cover 280 as an antenna for a radio frequency identification (RFID) reader 600, or may directly install the radio frequency identification (RFID) reader 600 on the styling cover 280.

Here, the first controller 300 may be configured for controlling power supplied to the radio frequency identification (RFID) reader 600.

The first controller 300 may supply power to the radio frequency identification (RFID) reader 600 using a power source such as a battery provided in the vehicle.

Also, the sensor 100 may store sense tire condition information at regular intervals in the storage portion 530 of the passive radio frequency identification (RFID) tag 500 using battery power provided therein.

The radio frequency identification (RFID) reader 600 may transmit a wireless signal, and when the transmitted wireless signal is received by the passive radio frequency identification (RFID) tag 500, the passive radio frequency identification (RFID) tag 500 may reflect the information to return the information.

The radio frequency identification (RFID) reader 600 may measure a distance between the passive radio frequency identification (RFID) tag 500 and the radio frequency identification (RFID) reader 600 through a signal strength measurement called a received signal strength indicator (RSSI).

For example, in the radio frequency identification (RFID) reader 600, the stronger the signal received from the passive radio frequency identification (RFID) tag 500, the closer the passive radio frequency identification (RFID) tag 500 may be in a close position, and the weaker the signal, the further away the passive radio frequency identification (RFID) tag 500 may be positioned.

The radio frequency identification (RFID) reader 600 may change the state of the radio frequency identification (RFID) reader 600 based on a distance between the passive radio frequency identification (RFID) tag 500 and the radio frequency identification (RFID) reader 600.

For example, signal strength received by the radio frequency identification (RFID) reader 600 may increase, and when the strength is smaller than a predetermined first distance (A) (when greater than signal strength corresponding to distance A), the state of the radio frequency identification (RFID) reader 600 may be changed from "unread" to "read."

Here, when the state of the radio frequency identification (RFID) reader 600 is "read," the radio frequency identification (RFID) reader 600 may receive and store real-time tire state information, and the first controller 300 may transmit real-time tire state information to the second controller 400.

Also, the signal strength received by the radio frequency identification (RFID) reader 600 decreases, and the strength is farther than a predetermined second distance B (when smaller than the signal strength corresponding to distance B), the state of the radio frequency identification (RFID) reader 600 may be changed from "read" to "unread."

Furthermore, when the state of the radio frequency identification (RFID) reader 600 is "unread," the radio frequency identification (RFID) reader 600 may transfer previously stored tire condition information to the second controller 400.

The apparatus for receiving a tire pressure monitoring signal according to various exemplary embodiments of the present disclosure may receive tire condition information once when a distance between the passive radio frequency identification (RFID) tag 500 and the radio frequency identification (RFID) reader 600 is within the first distance, and the apparatus may not perform reading until the distance between the passive radio frequency identification (RFID) tag 500 and the radio frequency identification (RFID) reader 600 becomes greater than the second distance. Accordingly, receiving the same tire condition information repeatedly may be prevented.

Tire condition information received by the radio frequency identification (RFID) reader 600 may be transmitted from the first controller 300 to the second controller 400.

The second controller 400 may perform as a receiver of a general tire pressure monitoring system.

For example, the second controller 400 may be configured for processing and analyze the received tire condition information.

Also, the second controller 400 may warn a driver or provide a notification (for example, a pop-up message on a display provided in the cluster) when the tire pressure or temperature is beyond a normal range based on the received tire condition information.

Also, the second controller 400 may monitor a normal operation of the tire pressure monitoring system and may detect and report malfunctions or defects.

Meanwhile, a radio frequency identification (RFID) tag 500 and a radio frequency identification (RFID) reader 600 may be provided on the entirety of tires provided in a vehicle. Accordingly, the radio frequency identification (RFID) reader 600 may receive tire condition information transmitted from the radio frequency identification (RFID) tag 500 provided on different tires.

Accordingly, the radio frequency identification (RFID) reader 600 may only receive information transmitted from the radio frequency identification (RFID) tag 500 provided on the same wheel, and may ignore the signal transmitted from the radio frequency identification (RFID) tag 500 provided on the other wheel.

For example, by reducing the output power of the radio frequency identification (RFID) reader 600, a distance at which the radio frequency identification (RFID) tag 500 may be activated may be shortened. In other words, the activation threshold distance between the radio frequency identification (RFID) reader 600 and the radio frequency identification (RFID) tag 500 may be reduced to a region of the corresponding wheel.

Also, the radio frequency identification (RFID) reader 600 may be configured for processing a wireless signal only when the signal strength returned from the radio frequency identification (RFID) tag 500 to the radio frequency identification (RFID) reader 600 is above a predetermined threshold.

Figure 6:
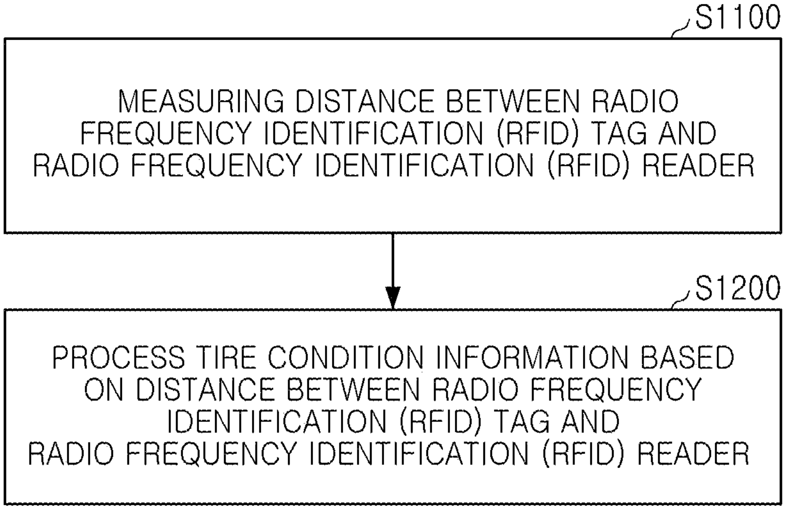
FIG. 6 is a flowchart illustrating a vehicle according to an exemplary embodiment of the present disclosure.
Figure 7:
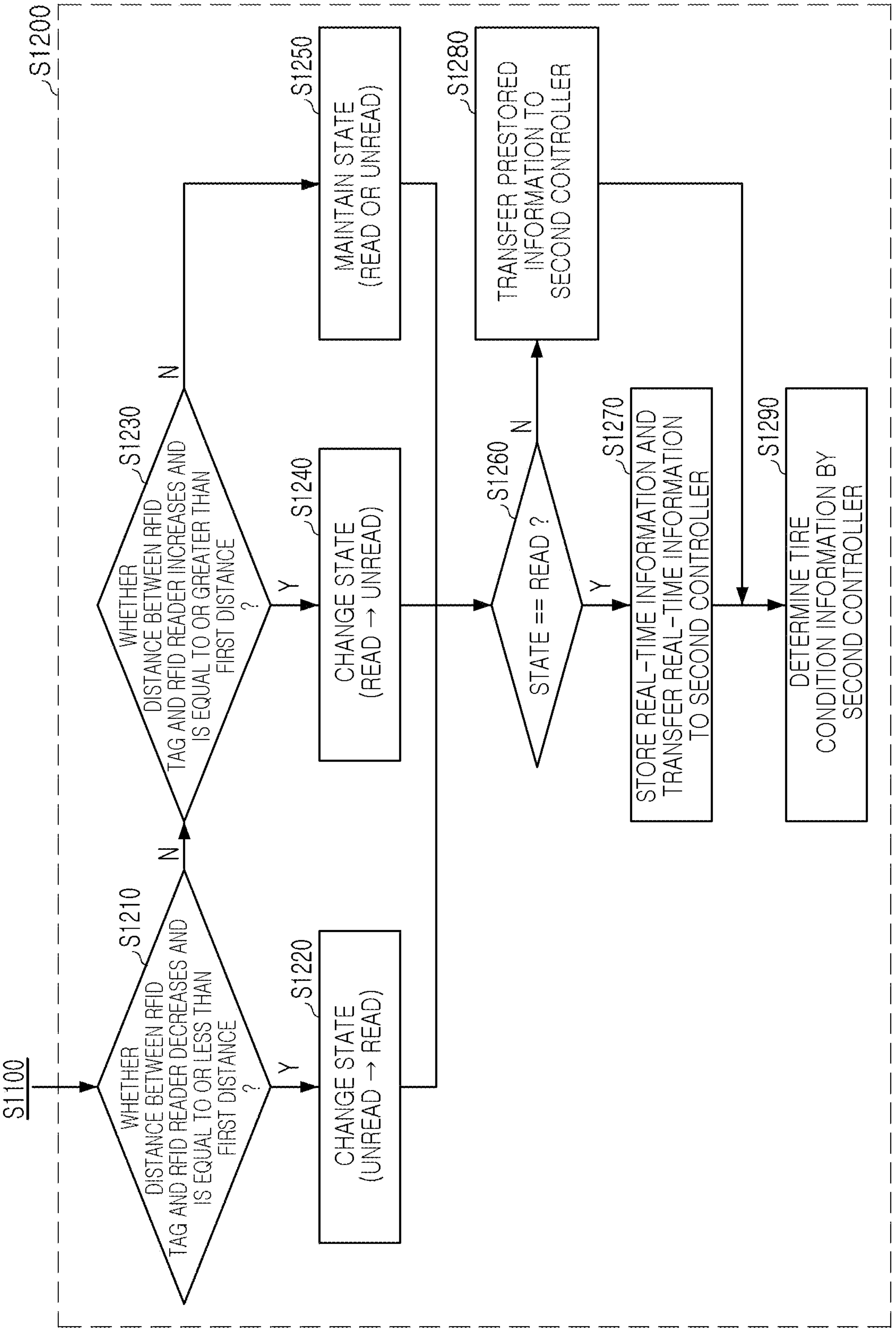
FIG. 7 is a detailed flowchart illustrating S1200 according to an exemplary embodiment of the present disclosure.

FIG. 6 is a flowchart illustrating a vehicle according to an exemplary embodiment of the present disclosure. FIG. 7 is a detailed flowchart illustrating S1200 according to an exemplary embodiment of the present disclosure. FIG. 7 is a detailed flowchart illustrating S1200 according to an exemplary embodiment of the present disclosure.

A method for receiving a tire pressure monitoring signal according to various exemplary embodiments of the present disclosure may include transmitting and receiving a tire pressure monitoring signal including tire condition information using a radio frequency identification (RFID) of a radio frequency identification (RFID) tag 500 and a radio frequency identification (RFID) reader 600.

Here, the radio frequency identification (RFID) reader 600 may be provided in an electro-mechanical brake 200 and may receive power from the electro-mechanical brake 200.

Referring to FIG. 6, the method for receiving a tire pressure monitoring signal according to various exemplary embodiments of the present disclosure may include measuring a distance between the radio frequency identification (RFID) tag 500 and the radio frequency identification (RFID) reader 600 (S1100).

The radio frequency identification (RFID) tag 500 provided in the sensor 100 may rotate with a wheel as a vehicle travels, and the radio frequency identification (RFID) reader 600 provided in the electro-mechanical brake (EMB) 200 may not rotate with the wheel so that a relative distance between the radio frequency identification (RFID) tag 500 and the radio frequency identification (RFID) reader 600 may change as the vehicle travels.

The radio frequency identification (RFID) reader 600 may measure a distance between the passive radio frequency identification (RFID) tag 500 and the radio frequency identification (RFID) reader 600 through a signal strength measurement referred to as a received signal strength indicator (RSSI).

For example, in the radio frequency identification (RFID) reader 600, the stronger the signal received from the passive radio frequency identification (RFID) tag 500, the closer the passive radio frequency identification (RFID) tag 500 may be positioned, and the weaker the signal, the further away the passive radio frequency identification (RFID) tag 500 may be positioned.

The radio frequency identification (RFID) reader 600 may identify whether the radio frequency identification (RFID) tag 500 and the radio frequency identification (RFID) reader 600 becomes close or farther away based on changes in strength of the wireless signal.

Also, the radio frequency identification (RFID) reader 600 may measure a distance between the radio frequency identification (RFID) tag 500 and the radio frequency identification (RFID) reader 600 based on strength of the wireless signal.

The method for receiving a tire pressure monitoring signal according to various exemplary embodiments of the present disclosure may be configured for processing tire condition information according to a distance between the radio frequency identification (RFID) tag 500 and the radio frequency identification (RFID) reader 600 (S1200).

The radio frequency identification (RFID) reader 600 may identify whether the distance between the radio frequency identification (RFID) tag 500 and the radio frequency identification (RFID) reader 600 is less than or equal to a predetermined first distance as the distance between the radio frequency identification (RFID) tag 500 and the radio frequency identification (RFID) reader 600 decreases (S1210).

For example, the radio frequency identification (RFID) reader 600 may identify whether strength of the wireless signal between the radio frequency identification (RFID) tag 500 and the radio frequency identification (RFID) reader 600 becomes greater than signal strength corresponding to the predetermined first distance as the wireless signal between the radio frequency identification (RFID) tag 500 and the radio frequency identification (RFID) reader 600 becomes stronger.

As the distance between the radio frequency identification (RFID) tag 500 and the radio frequency identification (RFID) reader 600 decreases less than the first preset distance as the distance between the radio frequency identification (RFID) tag 500 and the radio frequency identification (RFID) reader 600 decreases, the state of the radio frequency identification (RFID) reader 600 may be changed from "unread" to "read" (S1220).

The radio frequency identification (RFID) reader 600 may identify whether the distance between the radio frequency identification (RFID) tag 500 and the radio frequency identification (RFID) reader 600 is greater than a predetermined second distance as the distance between the radio frequency identification (RFID) tag 500 and the radio frequency identification (RFID) reader 600 increases (S1230).

For example, the radio frequency identification (RFID) reader 600 may identify whether strength of the wireless signal between the radio frequency identification (RFID) tag 500 and the radio frequency identification (RFID) reader 600 decreases than the signal strength corresponding to a predetermined second distance as the wireless signal between the radio frequency identification (RFID) tag 500 and the radio frequency identification (RFID) reader 600 becomes weaker.

The status of the radio frequency identification (RFID) reader 600 may be changed from "read" to "unread" when the distance between the radio frequency identification (RFID) tag 500 and the radio frequency identification (RFID) reader 600 is smaller than the predetermined second distance as the distance between the radio frequency identification (RFID) tag 500 and the radio frequency identification (RFID) reader 600 increases (S1240).

The status of the radio frequency identification (RFID) reader 600 may be maintained in an existing state when the distance between the radio frequency identification (RFID) tag 500 and the radio frequency identification (RFID) reader 600 does not satisfy the condition of being farther than the predetermined second distance as the distance between the radio frequency identification (RFID) tag 500 and the radio frequency identification (RFID) reader 600 increases (S1250).

It may be identified whether the state of the radio frequency identification (RFID) reader 600 is "read" (S1260).

When the state of the radio frequency identification (RFID) reader 600 is in the "read" state, the radio frequency identification (RFID) reader 600 may receive and store real-time tire condition information, and real-time tire status information may be transmitted to the second controller 400 through the first controller 300 (S1270).

When the state of the radio frequency identification (RFID) reader 600 is not in the "read" state, the radio frequency identification (RFID) reader 600 may transmit the previously stored tire condition information to the second controller 400 through the first controller 300 (S1280).

The method for receiving a tire pressure monitoring signal according to various exemplary embodiments of the present disclosure may include receiving tire status information once when the distance between the radio frequency identification (RFID) tag 500 and the radio frequency identification (RFID) reader 600 is within the first distance, and reading may not be performed again until the distance between the radio frequency identification (RFID) tag 500 and the radio frequency identification (RFID) reader 600 increases to a second distance or more, preventing receiving the same tire status information more than two times.

The second controller 400 may be configured for processing the received tire condition information (S1290).

For example, the second controller 400 may warn or provide a notification to the driver (e.g., a pop-up message on a display provided in a cluster) when the tire pressure or temperature is beyond a normal range based on the received tire condition information.

Also, the second controller 400 may monitor a normal operation of the tire pressure monitoring system and may detect and report malfunctions or defects.

The apparatus and a method for receiving a tire pressure monitoring signal may not include the process of wirelessly transmitting a tire pressure monitoring signal including tire information of the sensor 100, which consumes a great deal of power, battery lifespan of the sensor 100 may be extended.

Also, the apparatus and a method for receiving a tire pressure monitoring signal may include receiving tire condition information including a unique identification number of the radio frequency identification (RFID) tag 500, learning time to identify the position of the ID of the tire pressure monitoring sensor 100 may not be necessary, differently from the related art.

The methods according to an exemplary embodiment of the present disclosure may be implemented in a form of program instructions which may be executed through various computer means and written in a computer-readable medium. A computer-readable medium may include program instructions, data files, data structures, and the like, along or in combination. Program instructions written in a computer-readable medium may be specially designed and constructed for the present disclosure or may be known and usable by those skilled in the related art.

Examples of computer-readable medium may include hardware apparatus specially configured to store and execute program instructions, such as ROM, RAM, flash memory, or the like. Examples of program instructions may include machine language code produced by a compiler, and also high-level language code which may be executed by a computer using an interpreter. The above-described hardware apparatus may be configured to operate with at least one software module to perform operations, and vice versa.

According to the aforementioned embodiments, the apparatus and the method for receiving a tire pressure monitoring signal may reduce battery consumption of the sensor of the tire pressure monitoring system and may extend lifespan of the sensor.

Also, because ID information of the sensor may be identified immediately when power is supplied, travelling time for learning a sensor position may not be necessary.

Furthermore, the term related to a control device such as “controller”, “control apparatus”, “control unit”, “control device”, “control module”, or “server”, etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured for processing data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as “unit”, “module”, etc. included in the specification mean units for processing at least one function or operation, which may be implemented by hardware, software, or a combination thereof.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms “upper”, “lower”, “inner”, “outer”, “up”, “down”, “upwards”, “downwards”, “front”, "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An apparatus for receiving a tire pressure monitoring signal, the apparatus comprising:

a radio frequency identification (RFID) tag configured to transmit tire condition information;

a radio frequency identification (RFID) reader configured to receive the tire condition information and supply power to the radio frequency identification (RFID) tag; and a first controller configured to communicate with the radio frequency identification (RFID) reader and to control the power supplied to the radio frequency identification (RFID) reader, wherein the first controller is configured to control an electro-mechanical brake (EMB) of an electronic braking apparatus, wherein the radio frequency identification (RFID) reader is configured to generate a wireless signal and transmit the wireless signal to a surrounding area, wherein the wireless signal is received by the radio frequency identification (RFID) tag, and wherein the radio frequency identification (RFID) tag operate using energy of the wireless signal.

2. The apparatus of claim 1, wherein the radio frequency identification (RFID) tag is provided in a sensor configured to detect the tire condition information.

3. The apparatus of claim 2, wherein the sensor further includes a storage portion configured to store the tire condition information.

4. The apparatus of claim 1, further including:

a styling cover provided on an external side of the electronic braking apparatus, wherein the radio frequency identification (RFID) reader receives the tire condition information transmitted by the radio frequency identification (RFID) tag using the styling cover.

5. The apparatus of claim 4, wherein the radio frequency identification (RFID) reader is provided on the first controller.

6. The apparatus of claim 4, wherein the radio frequency identification (RFID) reader is provided on the styling cover.

7. The apparatus of claim 1, wherein a distance between the radio frequency identification (RFID) tag and the radio frequency identification (RFID) reader changes when a vehicle travels.

8. The apparatus of claim 7, wherein the radio frequency identification (RFID) reader is configured to determine whether to receive the tire condition information transmitted by the radio frequency identification (RFID) tag based on results of comparing predetermined first and second distances with a distance between the radio frequency identification (RFID) tag and the radio frequency identification (RFID) reader.

9. The apparatus of claim 8, wherein the radio frequency identification (RFID) reader receives the tire condition information transmitted by the radio frequency identification (RFID) tag in response that the distance between the radio frequency identification (RFID) tag and the radio frequency identification (RFID) reader decreases and is smaller than the first distance.

10. The apparatus of claim 8, wherein the radio frequency identification (RFID) reader does not receive the tire condition information transmitted by the radio frequency identification (RFID) tag in response that the distance between the radio frequency identification (RFID) tag and the radio frequency identification (RFID) reader increases and is greater than the second distance.

11. The apparatus of claim 1, wherein a pair of radio frequency identification (RFID) tags and the radio frequency identification (RFID) reader are provided for each tire included in the vehicle, and wherein the radio frequency identification (RFID) reader receives only the tire condition information transmitted from an adjacent radio frequency identification (RFID) tag.

12. The apparatus of claim 7, wherein a distance between the radio frequency identification (RFID) tag and the radio frequency identification (RFID) reader is measured using signal strength between the radio frequency identification (RFID) tag and the radio frequency identification (RFID) reader.

13. A method for receiving a tire pressure monitoring signal, the method comprising:

measuring a distance between a radio frequency identification (RFID) tag and a radio frequency identification (RFID) reader;

processing tire condition information in response that a distance between a radio frequency identification (RFID) tag and a radio frequency identification (RFID) reader decreases and is smaller than a predetermined first distance; and processing the tire condition information in response that the distance between the radio frequency identification (RFID) tag and the radio frequency identification (RFID) reader increases and is greater than a predetermined second distance.

14. The method of claim 13, wherein the radio frequency identification (RFID) tag communicates with the radio frequency identification (RFID) reader and a first controller configured to control an electro-mechanical brake (EMB), and receives power from the first controller.

15. The method of claim 14, wherein the radio frequency identification (RFID) reader is provided on a styling cover provided on an external side of an electronic braking apparatus.

16. The method of claim 13, wherein the radio frequency identification (RFID) tag rotates with a tire and is provided in a sensor configured to detect tire condition.

17. The method of claim 13, wherein a pair of the radio frequency identification (RFID) tag and the radio frequency identification (RFID) reader are provided for each tire provided in a vehicle, and the receiving the tire condition information includes receiving only the tire condition information transmitted from an adjacent radio frequency identification (RFID) tag by the radio frequency identification (RFID) reader.

18. The method of claim 13, wherein the measuring a distance between the radio frequency identification (RFID) tag and the radio frequency identification (RFID) reader includes measuring using signal strength between the radio frequency identification (RFID) tag and the radio frequency identification (RFID) reader.

19. The method of claim 13, wherein the radio frequency identification (RFID) reader receives the tire condition information transmitted by the radio frequency identification (RFID) tag in response that the distance between the radio frequency identification (RFID) tag and the radio frequency identification (RFID) reader decreases and is smaller than the predetermined first distance.

20. The method of claim 13, wherein the radio frequency identification (RFID) reader does not receive the tire condition information transmitted by the radio frequency identification (RFID) tag in response that the distance between the radio frequency identification (RFID) tag and the radio frequency identification (RFID) reader increases and is greater than the predetermined second distance.

* * * * *